June 13, 1950         S. D. VAN NORMAN              2,511,183
                      AIRCRAFT GUN MOUNT
Filed Dec. 29, 1944                            6 Sheets-Sheet 5
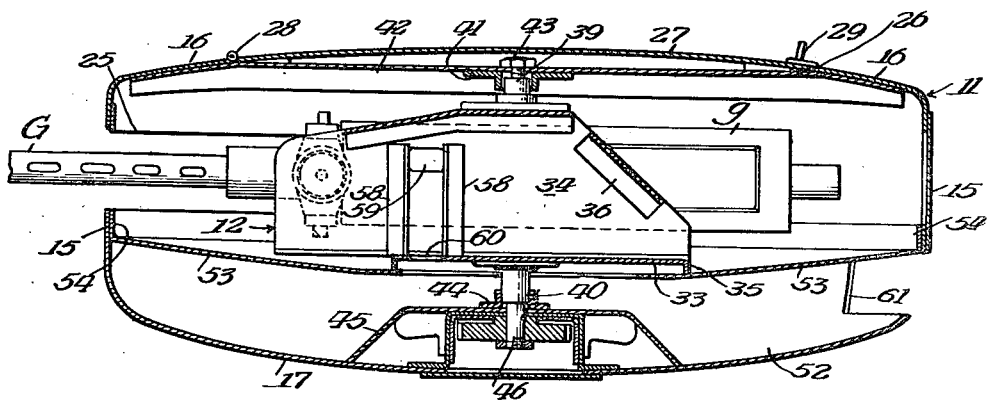
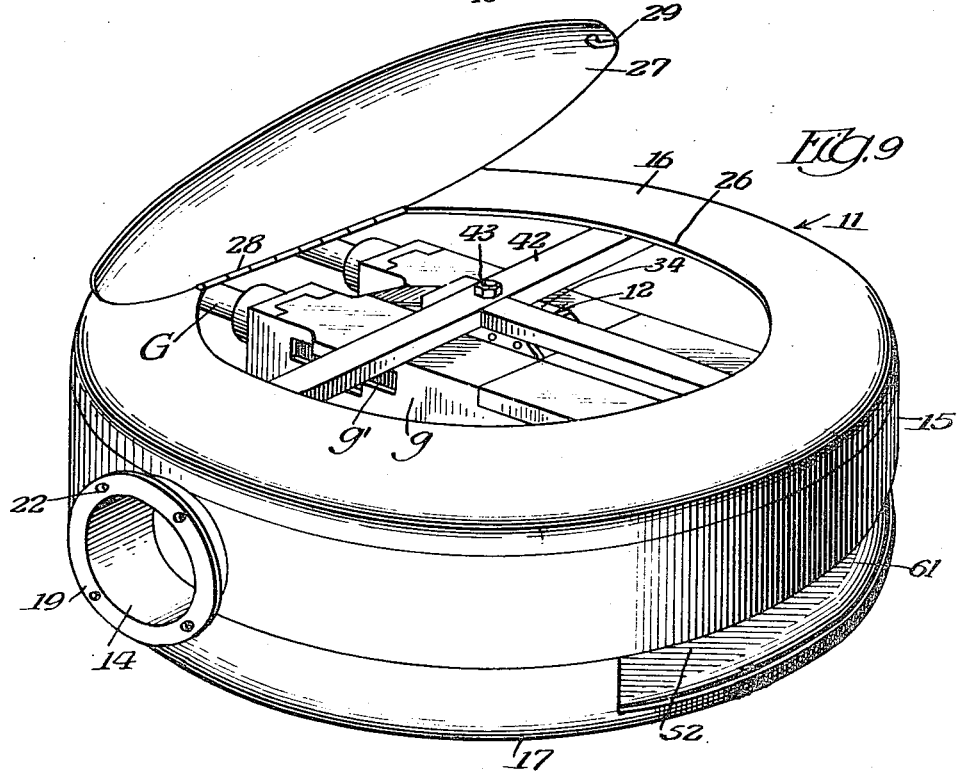
Inventor:
Stefan D. Van Norman
By June 13, 1950 S. D. VAN NORMAN 2,511,183
AIRCRAFT GUN MOUNT
Filed Dec. 29, 1944 6 Sheets-Sheet 6

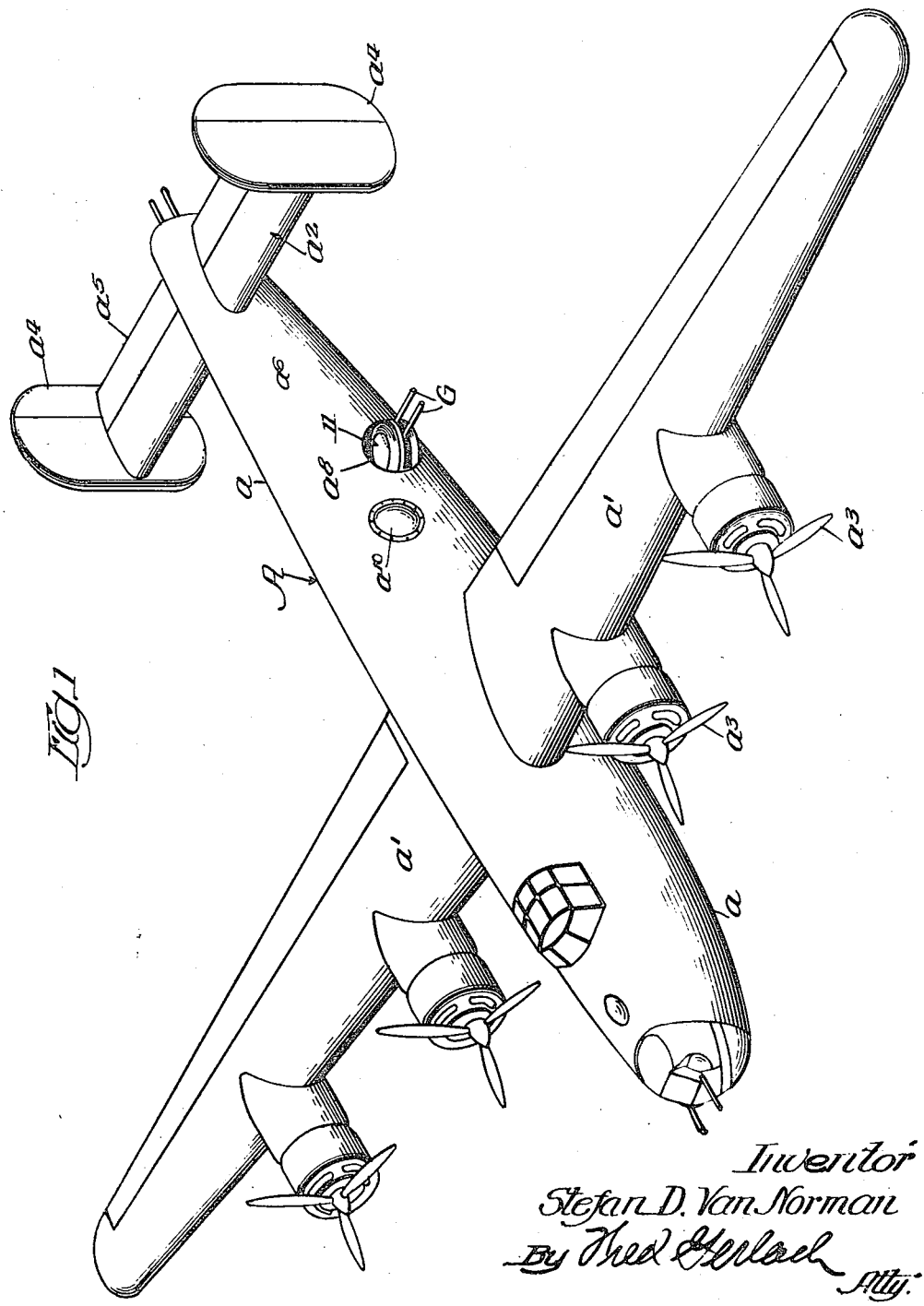

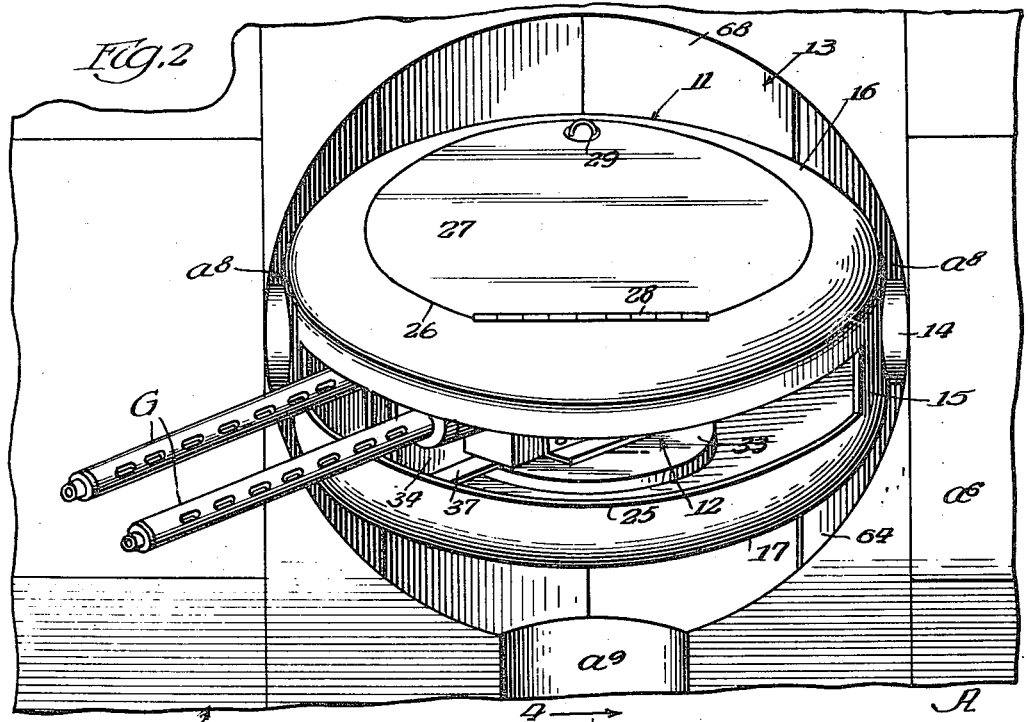
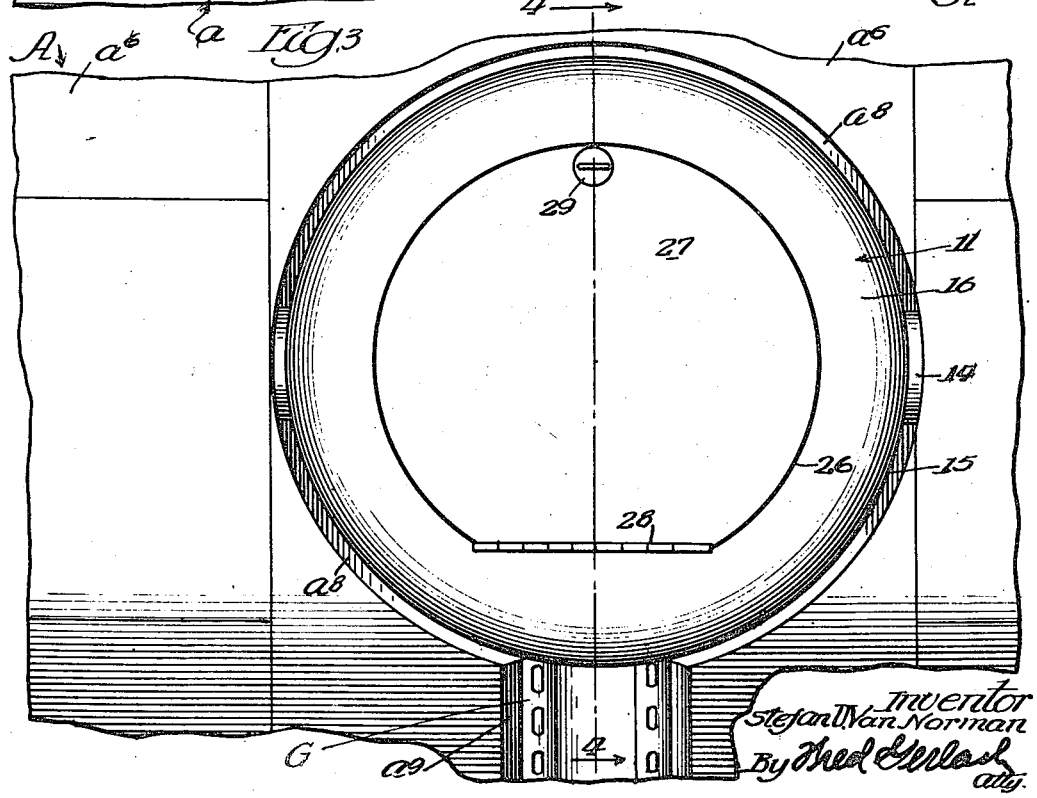

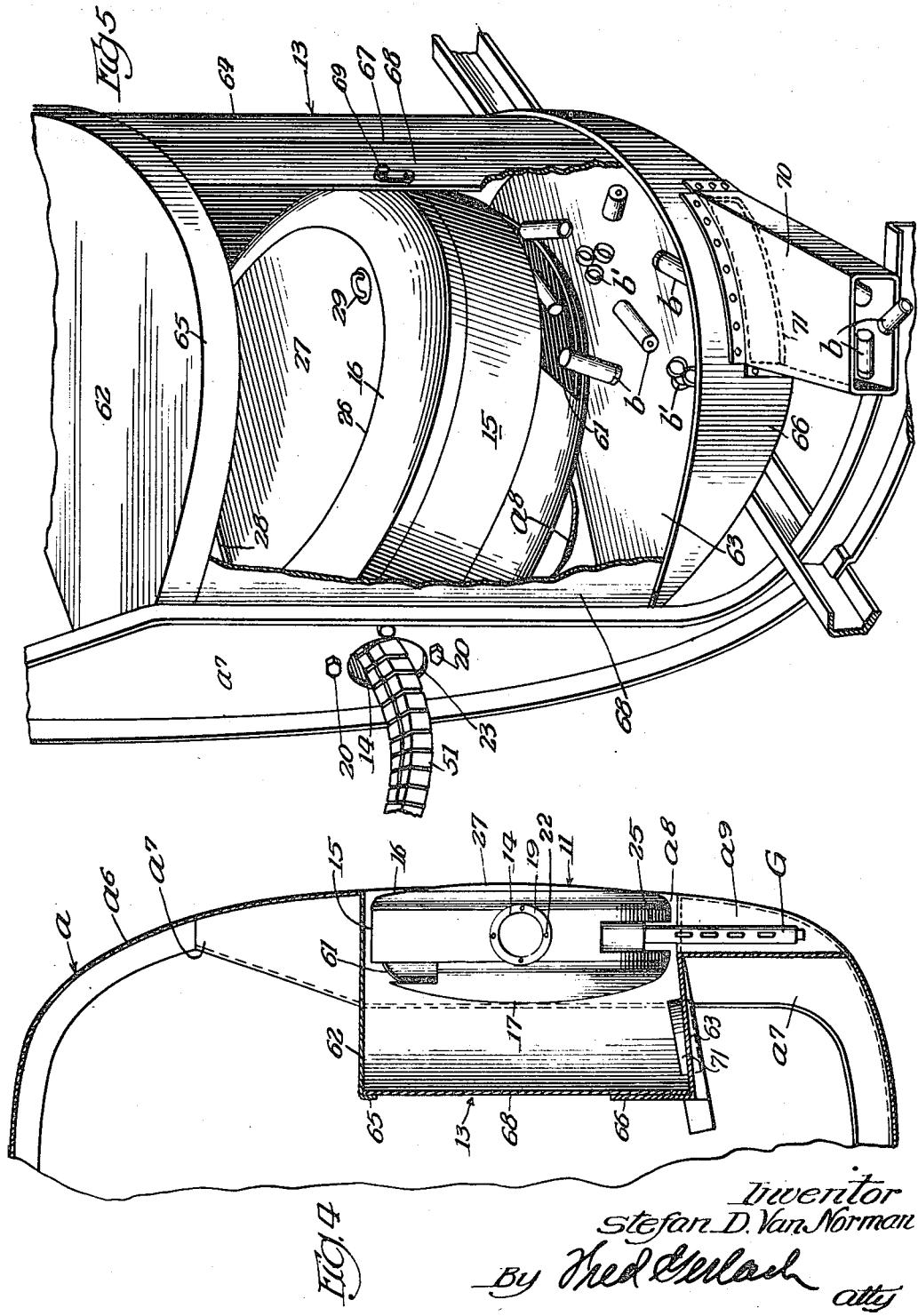

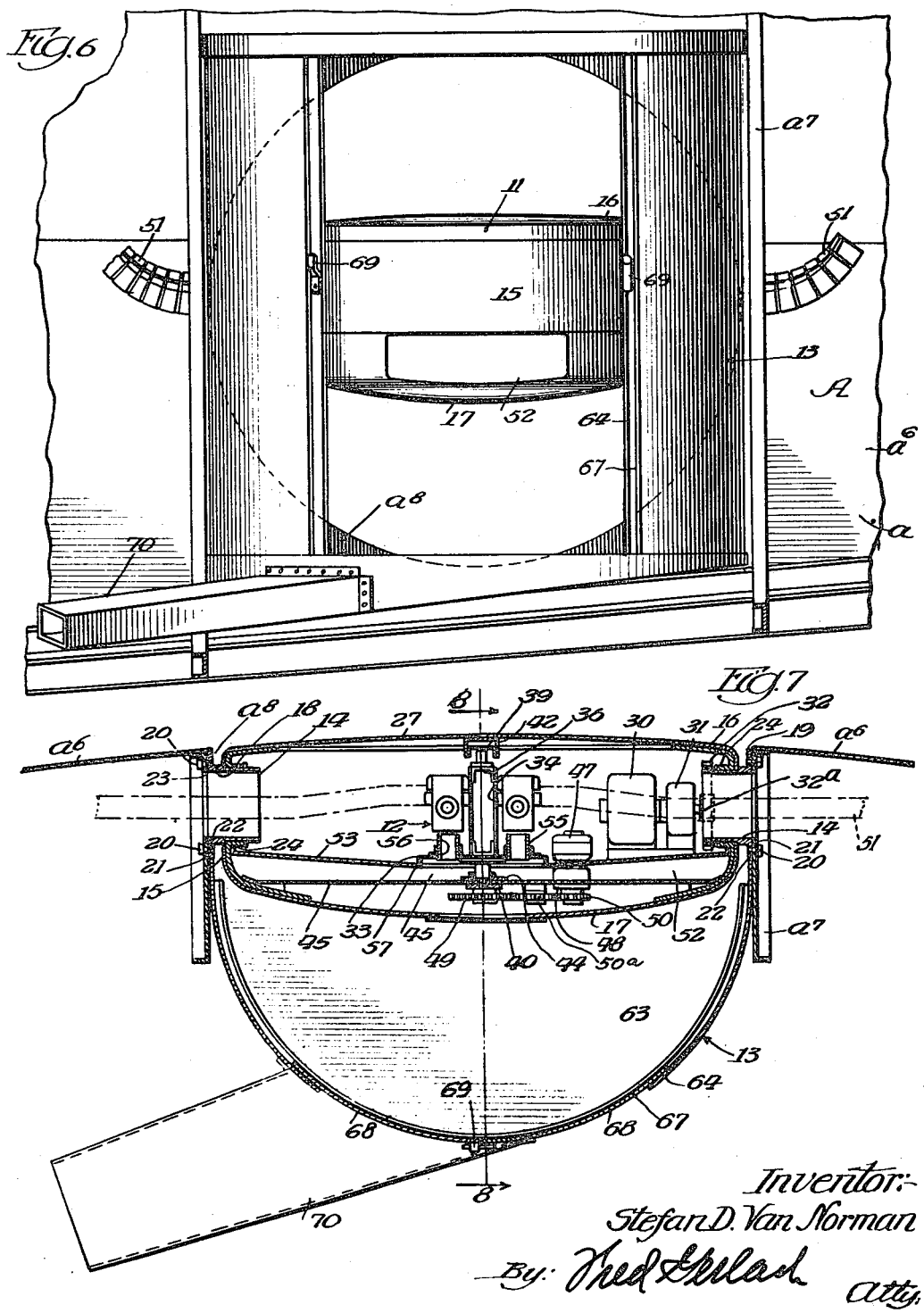

Inventor
Stefan D. Van Norman
By Fred Gerlach
Atty.

Patented June 13, 1950

2,511,183

UNITED STATES PATENT OFFICE 2,511,183

AIRCRAFT GUN MOUNT

Stefan D. Van Norman, San Diego, Calif., assignor to Consolidated Vultee Aircraft Corporation, San Diego, Calif., a corporation of Delaware Application December 29, 1944, Serial No. 570,241

13 Claims. (Cl. 89—37.5)

1

The present invention relates generally to machine gun mounts. More particularly the invention relates to that type of mount which is designed for use in connection with an aircraft having an aperture in one of the external surfaces thereof, and as its principal components comprises: (1) a turret which fits within the aperture, has a slot in its outer portion and is supported by a pair of axially aligned trunnions in order that it may be rotated or turned; and (2) a carrier which is disposed within the turret, serves to support a pair of machine guns in side by side relation and so that the barrels thereof project through the turret slot, and is pivotally supported so that the guns may be swung laterally about an axis at right angles to the axis of the turret trunnions.

One object of the invention is to provide an aircraft machine gun mount of this type which is an improvement upon, and has certain advantages over, previously designed mounts and is characterized by the fact that it is small in size and extremely light in weight.

Another object of the invention is to provide an aircraft machine gun mount of the type under consideration in which the rotatable turret is in the form of a disc, comprises a cylindrical side wall and a pair of circular end walls, has the trunnions for rotatably supporting it located at diametrically opposite portions of its side wall, has the slot for the machine gun barrels formed in the side wall, and is adapted when the guns are not in use to be rotated into what may be termed a stowed position wherein the end walls thereof are in substantially parallel relation with the portion of the external surface that defines the aperture in which the turret fits.

Another object of the invention is to provide an aircraft machine gun mount of the last mentioned character in which the turret supporting trunnions are so arranged that when the turret is in its stowed position the outer end wall thereof is substantially flush with the apertured external surface of the aircraft and hence the turret as a whole creates or produces substantially no aerodynamic drag when the aircraft with which the mount is associated is in flight.

Another object of the invention is to provide an aircraft machine gun mount in which the trunnions for rotatably supporting the turret are tubular and have extending therethrough flexible guides for feeding cartridge belts to the two machine guns on the rotatable carrier.

Another object of the invention is to provide an aircraft machine gun mount of the type under consideration in which the rotatable turret embodies within it a separate compartment for receiving the ejected cartridge cases and the belt clips and has in its cylindrical side wall a circumferentially extending slot which communicates with the compartment, is disposed diametrically opposite the slot for the machine gun barrels and permits the ejected cartridge cases and belt clips to be discharged from the turret when the turret is rotated so that the machine guns point upwards.

Another object of the invention is to provide an aircraft machine gun mount of the type under consideration which comprises in addition to the disc-like turret and the machine gun supporting carrier a semi-cylindrical housing which is located interiorly of the aircraft, extends around the inner portion of the turret and prevents air from entering the aircraft through the turret aperture.

A further object of the invention is to provide an aircraft machine gun mount of the last mentioned type and character in which the semi-cylindrical housing has a door closed opening in its side wall in order to provide access to the turret and embodies at the bottom thereof a hopper for delivering into the interior of the aircraft the ejected cartridge cases and belt clips which are discharged from the turret via the discharge slot in the cylindrical side wall of the turret.

A still further object of the invention is to provide an aircraft machine gun mount which is highly efficient in operation, consists of but a comparatively small number of parts, and may be produced at a relatively low cost.

Other objects of the invention and the various advantages and characteristics of the present aircraft machine gun mount will be apparent from a consideration of the following detailed description.

The invention consists of the several novel features which are hereinafter set forth and are more particularly defined by the claims at the conclusion hereof.

Figure 1 is a perspective view of a bomber type airplane having applied to one side of its fuselage a machine gun mount embodying the invention;

Figure 2 is an enlarged fragmentary side elevation of the side of the fuselage that has the machine gun mount, the turret of the mount being shown in its operative or firing position;

Figure 3 is a similar enlarged fragmentary side elevation, showing the turret in its stowed position wherein the end walls thereof are in parallel relation with the skin portion of the airplane fuselage that defines the aperture in which the turret fits;

Figure 4 is a vertical transverse section on the line 4—4 of Figure 3;

Figure 5 is a perspective view of the interiorly disposed parts of the gun mount, certain portions of the semi-cylindrical housing that extends around the inner portion of the turret being broken away for illustrative purposes;

Figure 6 is a side elevational view of the interiorly disposed parts of the mount, the doors of the semi-cylindrical housing being shown in their open position.

Figure 7 is a section through the turret illustrating in detail the construction, design and arrangement of the axially aligned trunnions for supporting the turret so that it may be rotated or turned;

Figure 8 is the section on the line 8—8 of Figure 7;

Figure 9 is a perspective of the turret showing the hinged cover on one of the end walls in its open position.

Figure 10:
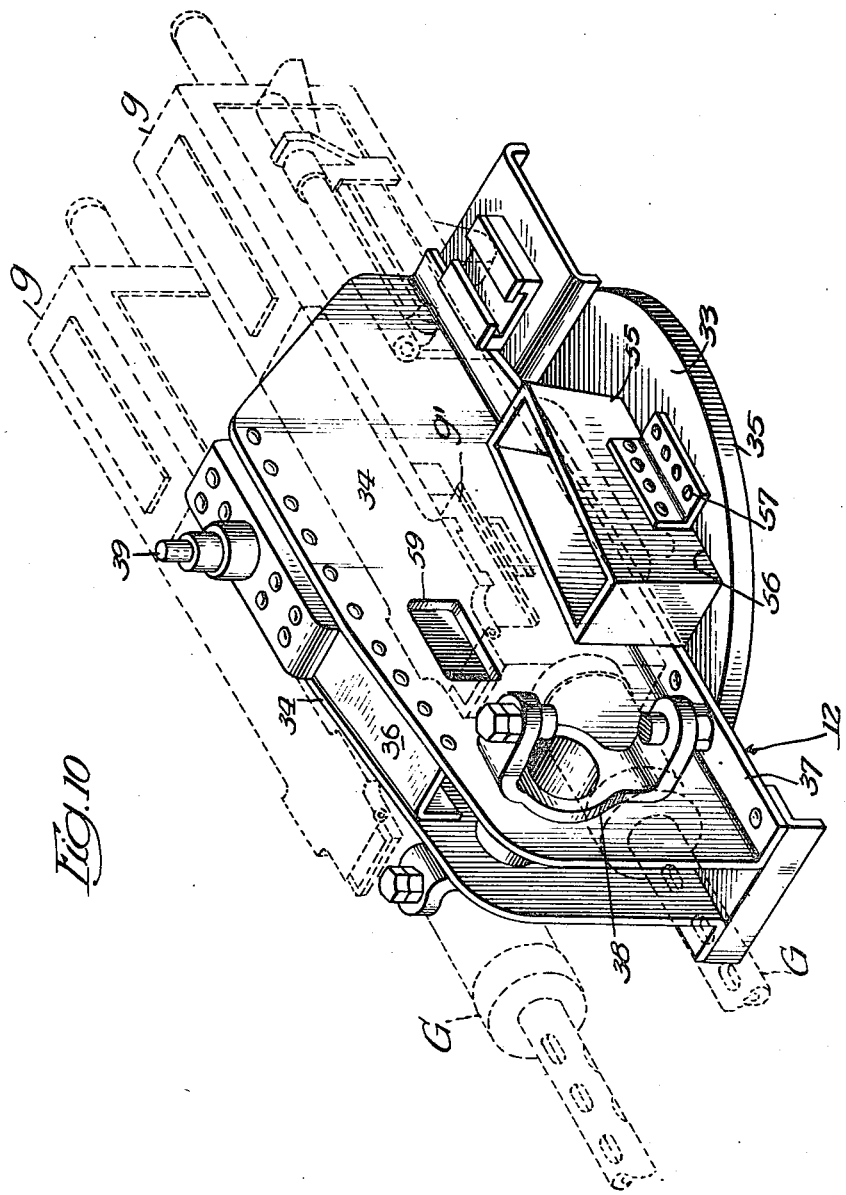
Figure 10 is a perspective of the machine gun supporting carrier that is pivotally supported within the turret so that the gun may be swung laterally about an axis at right angles to the axis of the turret trunnions.

The mount which is shown in the drawings constitutes the preferred form or embodiment of the invention. It is adapted for use in connection with a pair of machine guns G and is illustrated in connection with a bomber type airplane A. As its principal parts, the mount comprises a turret 11, a machine gun carrier 12 and a housing 13. The airplane A is of conventional or standard construction and embodies a fuselage $a$, a wing $a^1$ and an empennage $a^2$. The wing $a^1$ is connected to and projects outwards from the upper central portion of the fuselage and is provided with engine driven propellers $a^3$ along its leading edge. the empennage is mounted on the rear end of the fuselage $a$ and comprises, in addition to vertical and horizontal stabilizers, rudders $a^4$ and elevators $a^5$. The fuselage $a$ is provided with a tubular external skin $a^6$, and embodies between the wing and the empennage a pair of spaced apart continuous cross ribs $a^7$. The portion of the skin that is at one side of the fuselage and between the two spaced apart cross ribs $a^7$ is provided with a circular aperture $a^8$. This aperture is disposed slightly beneath the longitudinal center line or axis of the fuselage and leads into the fuselage interior. The portion of the fuselage skin that is directly beneath the aperture $a^8$ is inwardly deflected in order to form a substantially vertical well $a^9$. The machine gun mount is of the remote control variety, the control for the mount being of standard or conventional design and adapted to be actuated by the operator for the machine guns G through the medium of a sighting or gun pointing mechanism which is located within the fuselage behind a sighting blister $a^{10}$. The latter as shown in Figure 1 of the drawings is located ahead of and slightly above the aperture $a^8$ in the skin $a^6$ of the fuselage.

The turret 11 of the machine gun mount is in the form of a disc and fits within the aperture $a^8$. It is rotatably supported by way of a pair of axially aligned tubular trunnions 14 and comprises a cylindrical side wall 15 and a pair of circular end walls 16 and 17. The cylindrical side wall 15 of the turret is of but slightly less diameter than the aperture $a^8$ and embodies a pair of diametrically opposite circular holes 18 in the portions thereof that are adjacent the cross ribs $a^7$ of the airplane fuselage $a$. The tubular trunnions 14 are positioned adjacent to and inwards of the side portions of the aperture $a^8$ and as shown in the drawings are horizontally aligned. The outer ends of the trunnions are provided with integral outwardly extending annular flanges 19 and these fit flatly against the ribs $a^7$. Cap screws 20 extend through holes 21 in the cross ribs $a^7$ and registering screw-threaded sockets 22 in the flanges 19 and serve rigidly or fixedly to secure the trunnions in place. The heads of the cap screws 20 are disposed outwards of the flanges 19 in order that they are readily accessible when it is desired to remove the cap screws and thus release the trunnions. It is contemplated that the cap screws 20 will be removed when it is desired to release the turret in connection with replacement or jettisoning of the latter. The portions of the cross ribs $a^7$ that are in alignment with the trunnions 14 are provided with circular holes 23 in order to provide access to the interior of the trunnions. The inner ends of the trunnions 14 extend through the diametrically opposite circular holes 18 in the cylindrical side wall 15 of the turret 11 and are surrounded by cylindrical bearings 24 which are secured to the turret side wall directly inwards of the holes 18 and serve together with the trunnions 14 to support the turret so that it is rotatable about an axis which is horizontal when the airplane A is in normal flight. The bearings and trunnions permit the turret 11 to be tilted upwards and downwards in connection with operation or use of the machine guns G. The outer portion of the cylindrical side wall 15 of the turret is provided with a circumferential slot 25 which is adapted to have the barrels of the machine guns G extend therethrough and has its ends terminating adjacent the circular holes 18 through which the trunnions 14 project.

When the turret is not in use it is tilted into a so-called stowed position wherein the slot 25 in the cylindrical side wall 15 faces downwards and the circular end wall 16 faces outwardly of the aircraft and the circular end wall 17 is disposed on the inside of the aircraft. The vertically extending well $a^9$ beneath the bottom portion of the aperture $a^8$ in the fuselage skin $a^6$ is adapted to accommodate and house the barrels of the machine guns G when the turret is in its stowed position. The end wall 16 is so shaped and the turret supporting trunnions 14 are so arranged that when the turret is in its stowed position the end wall 16 is substantially flush with the portion of the fuselage skin that defines apertures $a^8$ and hence the turret as a whole creates or produces no aerodynamic drag when the airplane A is in flight.

The end wall 16 of the turret embodies a comparatively large centrally disposed hole 26 and this provides access to the interior of the turret and is normally closed by a circular cover 27. The latter is connected to the hole defining portion of the end wall 16 by a hinge 28 in order that it may be swung outwards into an open position. A latch 29 is mounted on the portion of the cover that is diametrically opposite the hinge and serves releasably to secure the cover in its closed position wherein it closes the access hole 26. When it is desired to obtain access to the interior of the turret from the inside of the fuselage $a$ of the airplane A, the turret it tilted or rotated so as to swing the machine guns G upwards into a position wherein they are substantially vertical. When the guns are so swung the end wall 16 of the turret is disposed on the inside and hence access may be had to the interior of the turret by releasing the latch 29 and swinging the cover 27 inwards into its open position.

Tilting or turning of the turret 11 is effected by way of a motor 30, a speed reducing unit 31 and a ring gear 32. Such parts are disposed within the turret 11 and are located adjacent one of the trunnions 14. The motor 30 is controlled by the remote control for the machine gun mount and is connected to drive the drive shaft of the speed reducing unit 31. The driven shaft of the unit is provided with a pinion 32a which meshes with and serves to drive the ring gear 32. The latter extends around and is fixed to the inner end of the adjacent trunnion 14. When the motor 30 is driven in one direction it serves to rotate the turret 11 so as to swing the machine guns G downwards. Reverse driving of the motor results in reverse tilting or turning of the turret and resultant upswing of the two machine guns G.

The carrier 12 constitutes the supporting medium for the machine guns G and is mounted within the central portion of the turret 11. It provides traversing or azimuth movement of the guns and comprises a disc 33 and a pair of parallel laterally spaced plates 34. The disc 33 is disposed adjacent and in parallel relation with the central portion of the turret end wall 17 and embodies an integral cylindrical right angle flange 35 which as best shown in Figures 7 and 8 of the drawings projects in the direction of the end wall 17. The plates 34 are cross connected and spaced apart by channel bars 36 and have along certain margins thereof outwardly extending flanges 37 which fit flatly against and are welded or otherwise fixedly secured to the central portion of the disc 33. As shown in the drawings the plates 34 are disposed adjacent the inner face of the disc 33 and project in the direction of the central portion of the turret end wall 16. The machine guns G are disposed in side by side relation adjacent the outer faces of the plates 34 and are secured to the carrier 12 by way of set screw-equipped yokes 38 (see Figure 10.) The latter are secured to and project outwards from the outer faces of the plates 34 and serve to support the guns so that the barrels thereof project outwards through the circumferential slot 25 in the outer portion of the circular side wall 15 of the turret. The carrier 12 is pivotally supported so that the guns may be swung laterally about an axis at right angles to the axis of the turret trunnions by means of a pair of axially aligned pintles 39 and 40. These pintles project in opposite directions and are disposed at true right angles to the trunnions 14. The pintle 39 is fixedly connected to one of the channel bars 36 between the carrier plates 34, extends in the direction of the central portion of the turret end wall 16 and is journalled in a bearing 41 on a T-shaped structural element 42 of U-shaped cross section (see Figures 7 and 9). Such element extends across the centrally disposed access hole 26 and has the ends thereof suitably secured to the turret end wall 16. The bearing 41 is located at the intersection of the intermediate and cross pieces of the T-shaped structural element 42. The pintle 39 extends through the bearing 41 and embodies a retaining nut 43 at its outer end. The pintle 40 which together with the pintle 39 supports the machine gun carrier 12 so that it is rotatable about an axis at right angles to the axis of the turret trunnions is connected to the central portion of the disc 33, projects in the direction of the central portion of the turret end wall 17 and is journaled in a bearing 44. The latter is mounted on the central portion of a channel beam 45 which extends across, and is fixedly secured to the inner face of, the turret end wall 17. As shown on the drawings the channel beam 45 is arranged so that the side flanges thereof project outwards, that is, in the direction of the turret end wall 17. The pintle 40 extends completely through the bearing 44 and is provided with a retaining nut 46 at its outer end. The carrier is rotated about its axis for machine gun swinging purposes by means of a motor 47, a speed reducing unit 48 and a gear 49. Such parts are located or housed within the channel beam 45. The motor 47 is controlled by the remote control for the mount and is connected to drive the shaft of the speed reducing unit 48. The driven shaft of the unit embodies a pinion 50 and this meshes with an idler gear 50a which in turn meshes with and serves the drive the gear 49. Such gear is keyed, splined or otherwise fixedly secured to the pintle 40 and is disposed inwards of the retaining nut 46. When the motor 47 is driven in one direction the carrier 12 together with the machine guns G is swung laterally in one direction and when the motor is reversely driven the carrier and guns are swung in the opposite direction.

The machine guns G are of standard or conventional design and embody housings g at their inner ends. Such housings contain the firing mechanisms for the guns and have on the outer side walls thereof breech openings $g^1$ whereby cartridge belts may be fed into them. The belts are of the type that comprise cartridges b and ring type clips $b^1$ for securing the cartridges together before firing thereof. They are fed to the breech openings $g^1$ in the outer side walls of the machine gun housings g by way of a pair of flexible guides 51. Such guides extend through the holes 23 in the cross ribs $a^7$ of the airplane fuselage a and the interiors of the trunnions 14 and have the receiving ends thereof connected to ammunition boxes (not shown) within the fuselage interior. The discharge ends of the flexible guides are connected to the outer side walls of the machine gun housings g. The latter have openings (not shown) in the bottom walls thereof for discharging the ejected cartridge cases and have openings (also not shown) in their inner side walls for discharging the ejected clips $b^1$ of the cartridge belts. The ejected cartridge cases and clips are collected in a compartment 52 within the turret 11. This compartment is formed between the turret end wall 17 and an annular shield 53. The outer marginal portion of the shield is provided with an integral right angle flange 54 which fits against and is fixedly secured to the inner face of the cylindrical side wall 15 of the turret 11. The inner margin of the shield 53 terminates adjacent the flange 35 on the marginal portion of the carrier disc 33. The ejected cartridge cases are introduced or delivered into the compartment 52 by a pair of chutes 55 which underlie and are in registry with the discharge openings in the bottom walls of the machine gun housings g. They extend through holes 56 in the carrier disc 33 and are fixedly secured to the disc by angle brackets 57. When the machine guns are in use the ejected cartridge cases pass through the chutes 55 into the compartment 52 between annular shield 53 and the turret end wall 17. The ejected cartridge belt clips $b^1$ are delivered into the compartment 52 by way of a chute 58 between the carrier plates 34 (see Figure 8). The receiving end of the chute 58 communicates with the clip discharging openings in the inner side walls of the machine gun housings $g$ by way of holes 59 in said carrier plates 34. The discharge end of the chute 58 communicates with the compartment 52 by way of a hole 60 in the carrier disc 33. When the machine guns are in operation the ejected cartridge belt clips $b^1$ enter the receiving end of the chute 58 through the holes 59 and then after passing through the chute enter the compartment 52 via the hole 60 in the carrier disc 35. By reason of the fact that the ejected cases and clips are delivered to the compartment 52 they are prevented or precluded from accumulating around the machine gun housings $g$ and interfering with the operation of the guns. In order to effect discharge of the collected cartridge cases and belt clips from the compartment 52 the inner portion of the cylindrically side wall 15 of the turret 11 is provided with a circumferentially extending slot 61. This slot communicates with the compartment 52 and is positioned diametrically opposite the slot 25 for the barrels of the machine guns. When it is desired to empty the compartment 52 the turret 11 is rotated or tilted so as to swing upwards the machine guns G. This results in the slot 61 swinging downwards and the collected cartridge cases and belt clips being discharged by gravity from the compartment 52 through the slot 61. The compartment 52 is of such capacity as to hold a substantial number of ejected cartridge cases and belt clips.

The housing 13 is semi-cylindrical so far as contour or conformation is concerned and is disposed in an upstanding position within the interior of the airplane fuselage $a$. It extends around the inner portion of turret 11, prevents air from entering the fuselage through the turret aperture $a^8$ and consists of a semi-circular top wall 62, a semi-circular bottom wall 63 and a semi-cylindrical side wall 64. The side wall 64 extends between and serves to space apart the top and bottom walls 62 and 63. The semi-circular top wall 62 is arranged so that the flat or straight side thereof abuts against the portion of the fuselage skin $a^6$ that overlies the turret aperture $a^8$, and has its corners fixed to the fuselage cross ribs $a^7$. The marginal portion of the top wall embodies an integral continuous downwardly extending flange 65. The semi-circular bottom wall 63 is positioned or arranged in the same manner as top wall 62 and has the flat or straight side thereof in abutment with the portion of the fuselage skin that underlies the turret aperture $a^8$. As shown in Figure 5 the bottom wall 63 has its corners positioned against, and secured to, the cross ribs $a^7$ and embodies a continuous upwardly extending flange 66. The semi-cylindrical side wall 64 of the housing has its side margins in abutment with and secured to the portions of the cross ribs between the top and bottom walls and has in its central portion a rectangular opening 67 in order to provide access to the turret 11. This opening is closed by a pair of slide type quarter round doors 68. The latter are adapted to slide circumferentially of the housing side wall 64 and have the upper margins thereof slidably mounted within arcuate tracks adjacent the depending flange 65 on the top wall 62 and their bottom margins slidably mounted in arcuate tracks adjacent the upstanding flange 66 on the bottom wall 63. When it is desired to expose the opening 67 in order to provide access to the turret 11 the doors 68 are slid apart into their open position. When the doors are slid together into their closed position the housing 13 closes off the turret aperture $a^8$ and thus prevents outside air from entering the fuselage interior via the aperture $a^8$. The housing 13 is constructed so that it is sealed when the doors 68 thereof are closed and hence it is possible to pressurize the fuselage interior in connection with high altitude flight of the airplane A. The inner margins of the doors are provided with latch elements 69 in order that the doors may be locked or retained in their closed position. The housing bottom wall 63 is inwardly canted and is provided at the low portion thereof with a hopper 70 in order to deliver into the interior of the airplane fuselage the ejected cartridge cases and belt clips which are discharged from the turret 11 via the discharge slot 61 in the cylindrical side wall 15 of the turret. The hopper is connected to and projects laterally from the upstanding flange 66 on the housing bottom wall 63 as shown in Figure 5. The receiving end of the hopper communicates with the interior of the housing 13 by an arcuate opening 71 in the flange 66 and the discharge end of the hopper leads to a sealed container (not shown) within the airplane fuselage. When the turret is rotated so as to swing upwards the machine guns G and swing downward the slot 61, the ejected cartridge cases and belt clips within the compartment 52 fall by gravity onto the housing bottom wall 63 and then slide through the hopper 70 to the aforementioned closed container at the discharge end of the hopper. The hopper 70 as shown in Figure 6 is downwardly inclined in the direction of its discharge end in order that the ejected cartridge cases and belt clips slide freely therethrough.

The herein described gun mount effectively and efficiently fulfills its intended purpose and is characterized by the fact that it is small in size and extremely light in weight. It is further characterized by the fact that it consists of but a small number of parts and hence may be produced or fabricated at a comparatively low cost. By reason of the fact that the turret end wall 16 is substantially flush with the aperture defining portion of the fuselage skin $a^6$ and the barrels of machine guns G are positioned within the well $a^9$ when the turret is in its stowed position, the mount as a whole produces substantially no aerodynamic drag when the airplane A is in flight. Because the machine gun belts are fed through the trunnions 14 and provision is made for delivering the ejected cartridge cases and belt clips into the interior of the airplane fuselage, the amount as a whole has substantially unlimited firing capacity.

Whereas the machine gun mount has been illustrated and described as being adjacent to one side of the airplane fuselage it is to be understood that it may be mounted on any other portion of the airplane. It is also to be understood that the invention is not to be restricted or limited to the details set forth since these may be modified within the scope of the appended claims without departing from the spirit and scope of the invention.

Having thus described the invention, what I claim as new and desire to secure by Letters Patent is:

1. A machine gun mount designed for use in connection with an aircraft having an aperture in one of its external surfaces and an internal supporting structure adjacent the aperture, and comprising a disc-like turret disposed within the aperture and embodying a substantially cylindrical side wall with an arcuate circumferentially extending slot and a pair of end walls at the ends of the side wall, pivot means between the supporting structure and opposite portions of the turret side wall adapted to support the turret for rotation within the aperture and so arranged and positioned that when the turret is not in use it may be rotated into a stowed position wherein its end walls are in substantially parallel relation with the apertured surface, and a carrier disposed within the turret, provided with means for supporting the machine gun with the barrel thereof in alignment with the slot, and pivotally supported so that the gun may be swung about an axis at right angles to the axis of rotation of the turret.

2. A machine gun mount designed for use with an aircraft having a circular aperture in one of its external surfaces and an internal supporting structure adjacent the aperture, and comprising a disc-like turret disposed within the aperture and embodying a cylindrical side wall of but slighthly less diameter than said aperture and with an arcuate circumferentially extending slot and a pair of circular end walls at the ends of the side wall, pivot means between the supporting structure and opposite portions of the turret side wall adapted to support the turret for rotation within the aperture and so arranged and positioned that when the turret is not in use it may be rotated into a stowed position wherein its end walls are in substantially parallel relation with the apertured surface, and a carrier disposed within the turret, provided with means for supporting the machine gun with the barrel thereof projecting through the slot, and pivotally supported so that the gun may be swung about an axis at right angles to the axis of rotation of the turret.

3. A machine gun mount designed for use with an aircraft having an aperture in one of its external surfaces and an internal supporting structure adjacent the aperture, and comprising a disc-like turret disposed within the aperture and embodying a substantially cylindrical side wall with an arcuate circumferentially extending slot and an end wall at one end of the side wall, pivot means between the supporting structure and opposite portions of the turret side wall adapted to support the turret for rotation within the aperture and so arranged and positioned that when the turret is not in use it may be rotated into a stowed position wherein its end wall is disposed outwards of the side wall and substantially flush and parallel with the apertured surface, and a carrier disposed within the turret, provided with means for supporting the machine gun with the barrel thereof in alignment with the slot, and pivotally supported so that the gun may be swung about an axis at right angles to the axis of rotation of the turret.

4. A machine gun designed for use with an aircraft having an aperture in one of its external surfaces and an internal supporting structure adjacent the aperture, and comprising a disc-like turret disposed within the aperture and embodying a substantially cylindrical side wall with an arcuate circumferentially extending slot and a pair of end wall at the end of the side wall, pivot means between the supporting structure and diametrically opposite portions of the turret side wall adapted to support the turret for rotation within the aperture and so arranged and positioned that when the turret is not in use it may be rotated into a stowed position wherein its end walls are in substantially parallel relation with the apertured surface and its outer end wall is substantially flush with said surface, and a carrier disposed within the turret, provided with means for supporting the machine gun with the barrel thereof projecting through the slot, and pivotally supported so that the gun may be swung about an axis at right angles to the axis of rotation of the turret.

5. A machine gun mount designed for use with an aircraft having a circular aperture in one of its external surfaces and an internal supporting structure adjacent the aperture, and comprising a disc-like turret disposed within the aperture and embodying a cylindrical side wall of but slightly less diameter than said aperture and with an arcuate circumferentially extending slot and a pair of circular end walls at the ends of the side wall, pivot means between the supporting structure and diametrically opposite portions of the turret side wall adapted to support the turret for rotation within the aperture and so arranged and positioned that when the turret is not in use it may be rotated into a stowed position wherein its end walls are in substantially parallel relation with the apertured surface and its outer end wall is substantially flush with said surface, and a carrier disposed within the turret, provided with means for supporting the machine gun with the barrel thereof in alignment with the slot, and pivotally supported so that the gun may be swung about an axis at right angles to the axis of rotation of the turret.

6. A machine gun mount designed for use with an aircraft having in one of its external surfaces an aperture and a well-forming recess leading from the aperture and in addition having an internal supporting structure adjacent the aperture, and comprising a disc-like turret disposed within the aperture and embodying a substantially circular side wall with an arcuate circumferentially extending slot and an end wall at one end of the side wall, pivot means between the supporting structure and diametrically opposite portions of the turret side wall adapted to support the turret for rotation within the aperture and so arranged and positioned that when the turret is not in use it may be rotated into a stowed position wherein its end wall is disposed outwards of the side wall and is substantially flush and parallel with the apertured surface, and a carrier within the turret, provided with means for supporting the machine gun with the barrel thereof projecting through the slot, pivotally supported so that the gun may be swung about an axis at right angles to the axis of rotation of the turret and adapted in connection with the rotation of the turret into its said stowed position to be swung into a position wherein the exposed end portion of the gun barrel is disposed within said well-forming recess.

7. A machine gun mount designed for use with an aircraft having in one of its external surfaces a circular aperture and a well-forming recess leading from the aperture and also having an internal supporting structure adjacent the aperture, and comprising a comparatively small disc-like non-inhabited turret disposed within the aperture and embodying a cylindrical side wall of but slightly less diameter than said aperture and with an arcuate circumferentially extending slot and a pair of end walls at the ends of the side wall, pivot means between the supporting structure and diametrically opposite portions of the turret side wall adapted to support the turret for rotation within the aperture and so arranged and positioned that when the turret is not in use it may be rotated into a stowed position wherein its end walls are in substantially parallel relation with the apertured surface and the outer end wall is substantially flush with said surface, and a carrier within the turret, provided with means for supporting the machine gun with the barrel thereof projecting through the slot, pivotally supported so that the gun may be swung about an axis at right angles to the axis of rotation of the turret, and adapted in connection with rotation of the turret into its stowed position to be swung into a position wherein the exposed end portion of the gun barrel is disposed within said well-forming recess.

8. A machine gun mount designed for use with an aircraft having an aperture in one of its external surfaces and an internal supporting structure adjacent the aperture, and comprising a housing-like turret disposed within the aperture and embodying a slot in its outer portion, pivot means between the supporting structure and opposite portions of the turret for supporting the turret for rotation within the aperture, a carrier disposed within the turret, provided with means for supporting the machine gun with the barrel thereof in alignment with the slot, and pivotally supported so that the gun may be swung about an axis at right angles to the axis of rotation of the turret, and means within the turret forming a compartment therein for receiving ejected cartridge cases and belt clips from the machine gun, said turret having an opening in its inner portion leading from the compartment and adapted when the turret is rotated so as to swing the gun upwards to permit said ejected cartridge cases and belt clips to be discharged from the turret into the interior of the aircraft.

9. A machine gun mount designed for use in connection with an aircraft having an aperture in one of its external surfaces and an internal supporting structure adjacent the aperture, and comprising a disc-like turret disposed within the aperture and embodying a substantially circular side wall with an arcuate circumferentially extending slot in its outer portion and a pair of end walls at the ends of the side wall, pivot means between the supporting structure and opposite portions of the turret side wall adapted to support the turret for rotation within the aperture, and a carrier within the turret provided with means for supporting the machine gun with the barrel thereof projecting through the slot, and pivotally supported so that the gun may be swung about an axis at right angles to the axis of rotation of the turret, said turret having a compartment therein for collecting cartridge cases and belt clips ejected from the machine gun, and in addition having in the inner portion of its side wall a circumferential slot communicating with the compartment and adapted when the turret is rotated so as to swing the gun upwards to permit the collected cartridge cases and belt clips to be discharged by gravity from the compartment into the interior of the aircraft.

10. A mount of the character described designed for use with an aircraft having an aperture in one of its external surfaces and an internal supporting structure adjacent the aperture, and comprising a small sized non-inhabited turret disposed within the aperture and embodying a substantially circular side wall with an arcuate circumferentially extending slot in its outer portion, a pair of axially aligned tubular trunnions extending between the supporting structure and opposite portions of the turret side wall, arranged to support the turret for rotation within the aperture, and adapted to have clip type cartridge belts pass therethrough into the interior of the turret, a carrier within the turret, provided with means for supporting a pair of machine guns in side by side relation and with the barrels thereof in alignment with said slot and so as to receive said belts, and pivotally supported so that the guns may be swung about an axis at right angles to the axis of rotation of the turret, and means associated with, and disposed in, the turret for collecting the cartridge cases and belt clips ejected from the machine guns and delivering them to the interior of the aircraft.

11. A mount of the character described designed for use with an aircraft having an aperture in one of its external surfaces and an internal supporting structure adjacent the aperture, and comprising a small sized non-inhabited turret disposed within the aperture and embodying a substantially circular side wall with an arcuate circumferentially extending slot in its outer portion, a pair of axially aligned tubular trunnions extending between the supporting structure and opposite portions of the turret side wall, arranged to support the turret for rotation within the aperture, and adapted to have clip type cartridge belts pass therethrough into the interior of the turret, and a carrier within the turret, provided with means for supporting a pair of machine guns in side by side relation and with the barrels thereof projecting through said slot and so as to receive said belts, and pivotally supported so that the guns may be swung about an axis at right angles to the axis of rotation of the turret, said turret having in the interior thereof a compartment for collecting the cartridge cases and belt clips ejected from the machine guns in connection with use of the latter and also having an opening in its inner portion communicating with the compartment and adapted when the turret is rotated so as to swing the guns upwards to permit the collected cartridge cases and belt clips to be discharged by gravity from said compartment into the interior of the aircraft.

12. A machine gun mount designed for use with an aircraft having an aperture in one of its external surfaces and an internal supporting structure adjacent the aperture, and comprising a turret disposed within the aperture and embodying a slot in its outer portion, pivotal means between the housing structure and opposite portions of the turret for supporting the turret for rotation within the aperture, a carrier within the turret provided with means for supporting the machine gun with the barrel thereof in alignment with the slot and pivotally supported so that the gun may be swung about an axis at right angles to the axis of rotation of the turret, means including an opening in the inner lower portion of the turret for discharging machine gun ejected cartridge cases and belt clips from the turret, and a housing within the aircraft, extending around the inner portion of the turret, adapted to prevent air from flowing through the turret aperture, and having hopper means at the bottom thereof for delivering into the aircraft interior the cartridge cases and belt clips that are discharged from the turret.

13. A machine gun mount designed for use with an aircraft having an aperture in one of its external surfaces and an internal supporting structure adjacent the aperture, and comprising a disc-like turret disposed within the aperture and embodying a substantially circular side wall with an arcuate circumferentially extending slot therein and an end wall connected to one end of the side wall and provided with a cover closed opening, pivot means extending between the supporting structure and opposite portions of the turret side wall and adapted to support the turret for rotation within the aperture and so that it may be rotated in one direction into a position wherein its end wall is disposed outwards of the side wall and is in substantially flush and parallel relation with the apertured surface, and may be reversely rotated into a position wherein the end wall is disposed inwards of the side wall and the cover closed opening is accessible for access to the turret interior, and a carrier within the turret, provided with means for supporting the machine gun with the barrel thereof projecting through the slot, and pivotally supported so that the gun may be swung about an axis at right angles to the axis of rotation of the turret.

STEFAN D. VAN NORMAN.

REFERENCES CITED

The following references are of record in the file of this patent:

UNITED STATES PATENTS

| Number | Name | Date |
| --- | --- | --- |
| 1,553,992 | Dawson et al. | Sept. 15, 1925 |
| 2,243,365 | Trotter | May 27, 1941 |
| 2,321,142 | Horncastle | June 8, 1943 |
| 2,336,557 | McCallister | Dec. 14, 1943 |
| 2,357,209 | Lanciani | Aug. 29, 1944 |

FOREIGN PATENTS

| Number | Country | Date |
| --- | --- | --- |
| 775,551 | France | Oct. 15, 1934 |
| 817,970 | France | June 7, 1937 |
| 515,993 | Great Britain | June 29, 1937 |
| 495,187 | Great Britain | Nov. 7, 1938 |
| 559,478 | Great Britain | Dec. 7, 1938 |